US009916561B2

(12) United States Patent
Marathe et al.

(10) Patent No.: US 9,916,561 B2
(45) Date of Patent: Mar. 13, 2018

(54) METHODS, DEVICES AND COMPUTER READABLE STORAGE DEVICES FOR TRACKING INVENTORY

(71) Applicant: AT&T Intellectual Property I, L.P., Atlanta, GA (US)

(72) Inventors: Nikhil S. Marathe, Roselle, IL (US); Christopher Baldwin, Algonquin, IL (US); Wayne Robert Heinmiller, Elgin, IL (US); Patrick Kenny, Barrington, IL (US); Susan Kenny, Barrington, IL (US); Michael Towster, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/071,873

(22) Filed: Nov. 5, 2013

(65) Prior Publication Data
US 2015/0127496 A1    May 7, 2015

(51) Int. Cl.
*G06G 1/14*    (2006.01)
*G06Q 20/00*    (2012.01)
(Continued)

(52) U.S. Cl.
CPC ................. *G06Q 10/087* (2013.01)

(58) Field of Classification Search
CPC .... G06Q 10/087; G06Q 20/203; G06Q 30/06; G06K 17/0022; G06K 2017/0067; G07G 1/0036
See application file for complete search history.

(56) References Cited

U.S. PATENT DOCUMENTS 6,571,279 B1 *   5/2003   Herz ................. G06F 17/30867
                                                          707/999.01
6,659,344 B2 * 12/2003   Otto .................... G06K 17/0022
                                                               235/381

(Continued)

FOREIGN PATENT DOCUMENTS

| WO | WO1998044462 | 10/1998 |
| WO | WO2011088568 | 7/2011 |
| WO | WO2013033442 | 3/2013 |

OTHER PUBLICATIONS

"Inescapable Data: Harnessing the Power of Convergence," Stakutis et al., 2005 (Book). FT Press, pp. 188 and 190.
(Continued)

*Primary Examiner* — Ig T An
(74) *Attorney, Agent, or Firm* — Hartman & Citrin LLC (57) ABSTRACT

The location of a container and the location of a storage device that stores a particular item are determined. A determination is made that the particular item is placed in the container. The locations of the particular item and the container are tracked as the container moves through a premises. For a purchase-related transaction, a determination is made whether the location of the particular item corresponds to the location of the container. If the location of the particular item corresponds to the location of the container, a cost for the particular item is included in the purchase-related transaction. If not, the cost for the particular item is not included in the purchase-related transaction, and the location of the particular item is accounted for.

14 Claims, 7 Drawing Sheets

(51) Int. Cl.
*G06Q 10/08* (2012.01)
*G06Q 30/00* (2012.01)
*G06Q 10/00* (2012.01)

(56) References Cited

U.S. PATENT DOCUMENTS

| | | | | |
|---|---|---|---|---|
| 7,573,386 | B2 * | 8/2009 | Lahiri | B65D 79/02 340/10.1 |
| 7,762,458 | B2 * | 7/2010 | Stawar | B62B 3/1408 235/383 |
| 7,780,081 | B1 * | 8/2010 | Liang | G06Q 30/0633 235/383 |
| 7,920,062 | B1 * | 4/2011 | Konstad | A47F 9/045 340/568.5 |
| 8,201,737 | B1 * | 6/2012 | Palacios Durazo | G06Q 10/087 235/383 |
| 2002/0113123 | A1 * | 8/2002 | Otto | G06K 17/0022 235/381 |
| 2002/0161651 | A1 * | 10/2002 | Godsey | G06Q 20/202 705/22 |
| 2005/0027443 | A1 * | 2/2005 | Cato | G06Q 10/0875 701/472 |
| 2008/0231448 | A1 * | 9/2008 | Fowler | G06K 7/0008 340/572.1 |
| 2008/0249870 | A1 * | 10/2008 | Angell | G06Q 30/02 705/14.53 |
| 2013/0211976 | A1 * | 8/2013 | Breed | G06Q 10/06 705/28 |

OTHER PUBLICATIONS

"Swipe, Scan, Scram; The Shopping Experience is Being Automated," Levy, Melissa, Jan. 17, 2004, StarTribune.

\* cited by examiner

METHODS, DEVICES AND COMPUTER READABLE STORAGE DEVICES FOR TRACKING INVENTORY

TECHNICAL FIELD

The present disclosure relates generally to communications, and, more particularly, to inventory tracking.

BACKGROUND

Theft of inventory is a common problem that occurs in retail stores. Small products are easy to hide in a shopping cart under larger items. With the growing popularity of self-checkout, such small items may be easily carried out of the store without being purchased, as larger items that have been purchased may simply be placed on top of the small items after checkout.

Another problem related to self-checkout is that it is manually intensive for the shopper, as items have to be individually taken out of the shopping cart, scanned and weighed before payment is made. Often, the help of store personnel is needed to complete a transaction.

Loss of inventory is another problem that is common for retail stores. As a shopper moves throughout a store, he or she may pick an item up from a shelf, place it in a shopping cart, but then take the item out of the shopping cart and put the item down on another shelf or another location in the store that is not near the shelf from which the item was picked up. Typically, such misplaced items are manually tracked by store personnel, which is labor-intensive and time-consuming. The problem is intensified for perishable items, such as produce, because if the item is not found and put back on the appropriate shelf in a short enough amount of time, it cannot be sold.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method is provided for tracking inventory. The method includes determining a location of a container with respect to a premises and determining a location of a storage device with respect to the premises. The storage device stores a particular item. The method further includes determining that the particular item is placed in the container, tracking a location of the particular item and the location of the container as the container moves through the premises, and determining, for a purchase-related transaction, whether the location of the particular item corresponds to the location of the container. If the location of the particular item corresponds to the location of the container, a cost for the particular item is included in the purchase-related transaction. If the location of the particular item does not correspond to the location of the container, the cost for the particular item is not included in the purchase-related transaction, and the location of the particular item is accounted for.

According to another embodiment, a device is provided for tracking inventory. The device includes a processor and a memory. The memory has instructions stored thereon which, when executed by the processor, cause the processor to perform operations. The operations include determining a location of a container with respect to a premises and determining a location of a storage device with respect to the premises. The storage device stores a particular item. The operations further include determining that the particular item is placed in the container, tracking a location of the particular item and the location of the container as the container moves through the premises, and determining, for a purchase-related transaction, whether the location of the particular item corresponds to the location of the container. If the location of the particular item corresponds to the location of the container, a cost for the particular item is included in the purchase-related transaction. If the location of the particular item does not correspond to the location of the container, the cost for the particular item is not included in the purchase-related transaction, and the location of the particular item is accounted for.

According to another embodiment, a computer readable storage device has instructions stored thereon which, when executed by a processor, cause the processor to perform operations for tracking inventory. The operations include determining a location of a container with respect to a premises and determining a location of a storage device with respect to the premises. The storage device stores a particular item. The operations further include determining that the particular item is placed in the container, tracking a location of the particular item and the location of the container as the container moves through the premises, and determining, for a purchase-related transaction, whether the location of the particular item corresponds to the location of the container. If the location of the particular item corresponds to the location of the container, a cost for the particular item is included in the purchase-related transaction. If the location of the particular item does not correspond to the location of the container, the cost for the particular item is not included in the purchase-related transaction, and the location of the particular item is accounted for.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale, and some features may be exaggerated or minimized to show details of particular components. Specific structural and functional details disclosed herein are not to be interpreted as limiting.

According to illustrative embodiments, an inventory tracker matches or correlates a weight, location, and time of an item that is removed from a storage device with a weight, location and time of an item that is added to a container. As items are added to and/or removed from the container and/or storage device, the locations of the items are tracked. The location of the container is also tracked. Accounting for inventory in this manner provides for accurate and efficient inventory control.

According to illustrative embodiments, inventory control during a shopping experience is improved by tracking the location of an item with respect to the shopper and/or shopping cart as the shopper moves through the store, up until the time of checkout. In this disclosure, the term "shopping call" is used to refer to a container in which a product may be placed for purchase. It should be appreciated that the shopping cart need not be moved by a shopper but may be, e.g., robotic. Further, it should be appreciated that the container in which a product is placed for purchase is not limited to a shopping cart. The "container" may include a basket, a bag, etc. Further, while the description contained in this disclosure is directed towards tracking inventory in a retail store, it should be appreciated that the concepts described herein may be applicable to tracking inventory in other environments, e.g., a warehouse, a library, etc.

To illustrate various aspects of the present disclosure, consider a scenario in which a shopper enters a retail store and begins shopping. This scenario may be understood with reference to FIGS. 1A-1D.

Figure 1A:
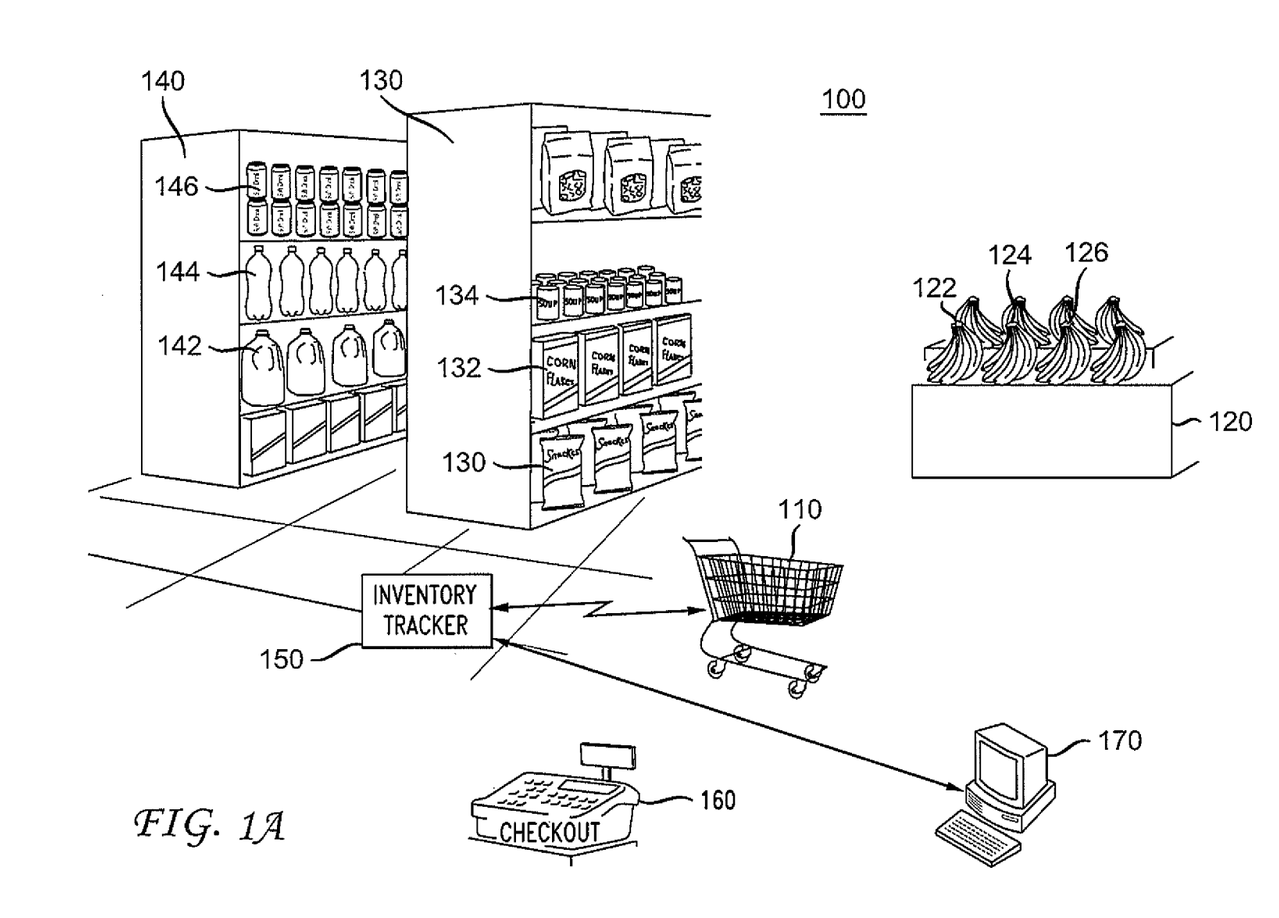
FIGS. 1A-1D illustrate a shopping environment in which embodiments described in the present disclosure can be implemented.

Referring to FIG. 1A, the shopper enters a retail premises 100 and picks a container, e.g., a shopping cart 110. The shopping cart 110 is equipped with a communication device that communicates with an inventory tracker 150 to report the location of the shopping cart 110 and the weight of the shopping cart 110. Both the location and the weight of the shopping cart 110 are continually tracked by the inventory tracker 150.

With regard to the location tracking, the shopping cart 110 further includes hardware and/or software (not shown in detail) used to determine a location or position of the shopping cart. The locating features may be part of or connected to the communication device, such as the location component 236 shown in FIG. 2. The location or position can be in the form of a global position, such as global coordinates (e.g., latitude, longitude), a location indication specific to the premises 100, etc.

With regard to the weight tracking, the shopping cart 110 further includes hardware and/or software (not shown in detail) used to sense additions and reductions in weight to the shopping cart 110. Such sensors may communicate any change in the weight of the shopping cart 110 to the communication device on the shopping cart 110.

Referring again to FIG. 1A, when the shopper picks the shopping cart 110, the location of the shopping cart 110 is reported to the inventory tracker 150 via the communication device. As the shopping cart 110 moves through the retail premises, the location of the shopping cart 110 is tracked. Also, the weight of the shopping cart 110 is tracked. Further details of the communication device are provided below with reference to FIG. 2.

The inventory tracker 150 may also send an alert to the store computer 170 indicating, e.g., that a shopper has entered the premises and/or that the shopping cart 110 has been picked. The store computer 170 and the inventory tracker 150 may also receive video images from cameras (not shown) within the store premises 100 indicating that the shopper has entered the premises and picked up the shopping cart 110. Such cameras are described in further detail below.

Figure 1B:
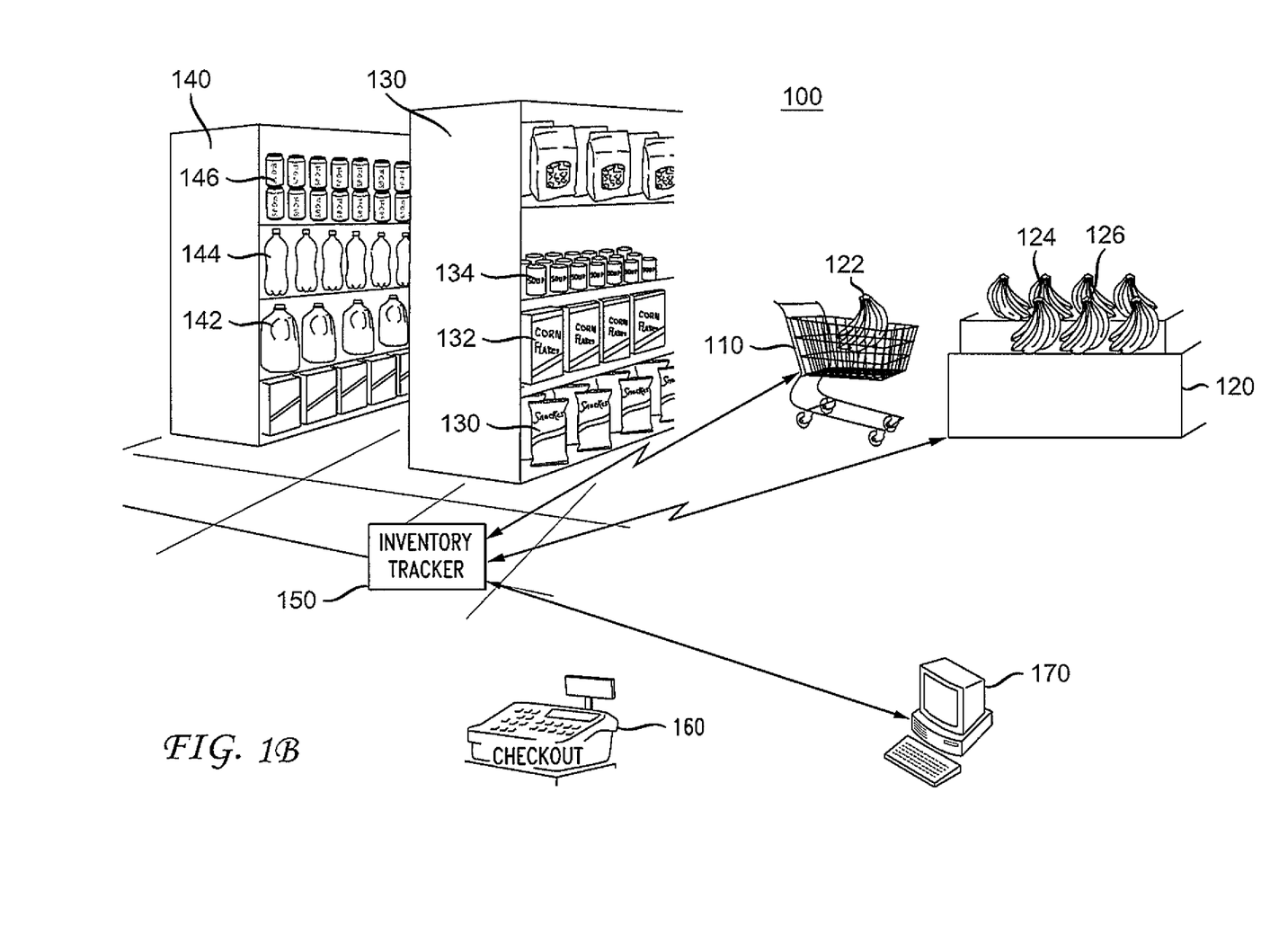

Referring to FIG. 1B, as the shopper moves through the store premises 100, he or she picks up an item, e.g., bananas 122, from a bin 120 containing items 122, 124, and 126. The bin 120 is equipped with a sensor (not shown in detail) that detects an amount of weight lost when the bananas are removed from the bin 120. The bin 120 also includes a communication device that sends information indicating the amount of weight lost to the inventory tracker 150. The communication device on the bin 120 may be similar to that described with reference to FIG. 2 below.

As the bananas 122 are placed in the shopping cart 110, a sensor in the shopping cart 110 (not shown in detail) detects the weight added to the shopping cart 110. This weight information is sent from the communication device attached to the shopping cart 110 to the inventory tracker 150.

In addition to sending weight information, location information is sent from the shopping cart 110 to the inventory tracker 150, indicating the location of the shopping cart 110. The bin 120 may also send location information indicating its location. Alternatively, the location information of the bin 120 may be stored in the inventory tracker 150 and updated as needed. For example, if the location of the bin 120 is permanent or semi-permanent, the location of the bin 120 need not be transmitted to the inventory tracker 150 when a reduction in weight on the bin 120 is detected. Rather, this location information may be stored in the inventory tracker 150 and updated when/if the location of the bin 120 changes.

Also, time information may be sent from the shopping cart 110, indicating a time at which the bananas 122 are placed in the shopping cart 110. Similarly, time information may be sent from the bin 120, indicating a time at which the bananas 122 are removed from the bin 120. The time information may be sent in the form of a time stamp.

The inventory tracker 150 determines whether the weight lost from the bin 120 approximately matches (or corresponds to) the weight added to the shopping cart 110. The inventory tracker 150 also determines whether the location of the shopping cart 110 approximately matches (or corresponds to) the location of the bin 120. In addition, the inventory tracker 150 determines whether the time information sent from the bin 120 approximately matches (or corresponds to) the time information sent from the shopping cart 110. If the inventory tracker 150 determines that the weight of the item, e.g., the bananas 122, removed from the bin 120 matches the weight of the item, e.g., the bananas 122, added to the shopping cart 110, the location of the shopping cart 110 approximately matches the location of the bin 120, and the time at which the item is removed from the bin 120 approximately matches the time at which the item is placed in the shopping cart 110, then the inventory tracker 150 may send information to the shopping cart 110 to add the item to a shopping list. The shopping list may be displayed on the communication device attached to the shopping cart 110, as described in more detail below with reference to FIG. 2.

It should be appreciated that there may be tolerances for differences in weight, location, and time that are taken into account by the inventory tracker 150. For example, the inventory tracker 150 may determine that the weights match if they are within a certain number of ounces, depending on the item. The weight tolerance may be higher for heavier items and less for lighter items. Similarly, the inventory tracker 150 may determine that the locations match if they are within a certain distance, e.g., a foot. Also, the inventory tracker 150 may determine that the times match if they are within a certain time window, e.g., 20 seconds. The tolerances may be variable, such that if, for example, the weights match and the locations match, the time tolerance may be extended.

For example, if a shopper picks up the bananas 122 and carries them for a couple of minutes before putting them in the shopping cart 110, the inventory tracker 150 may still determine that the bananas 122 are added to the shopping cart 110. That is, the inventory tracker 150 may determine that, although no item of the same weight of the bananas 122 were reported as being picked up from a container at a current location of the shopping cart 110, but the shopping cart 110 was previously at a location near the container 120, then the item added to the shopping cart 110 must be the bananas 122, even though there may be a significant delay from the time the bananas 122 were detected as being picked up from the bin 120 to the time at which an item having the same weight as the bananas 122 is detected as being added to the shopping cart 110. In addition, the inventory tracker 150 may determine that, if an item having the same weight as the bananas 122 is added to the shopping cart 110 before the bin 120 reports a reduction in weight that corresponds to the bananas 122, then the item added to the shopping cart 110 cannot be the bananas 122.

As the inventory tracker 150 verifies that items are added to the shopping cart 110, the shopping list may be displayed on the communication device attached to the shopping cart 110. If an item added to the shopping list does not correspond to what was placed in the shopping cart 110, the shopper may scan, e.g., a bar code, on the item so that the correct item appears on the shopping list. Also, image recognition may be used to verify and/or detect addition of items in the shopping cart 110 based on images detected by a camera within the shopping cart 110 and/or a store camera. This is described in more detail below with reference to FIG. 2.

If the sensor on the bin 120 detects removal of the bananas 122 and indicates this to the inventory tracker 150, but there is no detection of placement in the shopping cart 110 of the bananas 122, the inventory tracker 150 may send a communication to a store computer 170 to alert store personnel that the bananas 122 have, e.g., fallen off the bin 120. This enables store personnel to place the bananas 122 back on the bin 120 before the bananas 122 are stepped on or otherwise damaged.

Figure 1C:
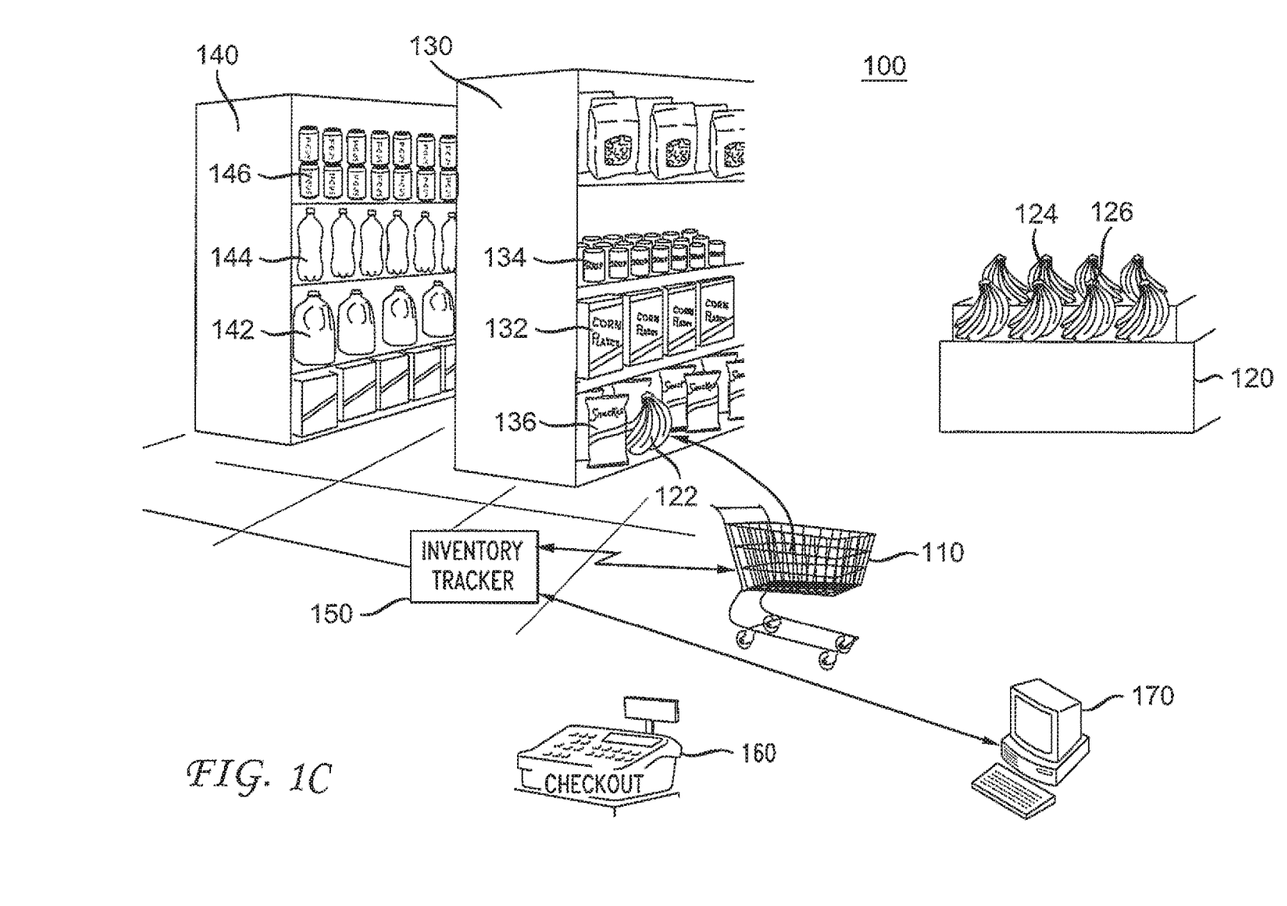

Referring now to FIG. 1C, the shopping cart 110 moves to another location within the store premises near shelves 130 and 140 that store items 132, 134 and 136 and items 142, 144, and 146, respectively. While near the shelf 130, the bananas 122 are removed from or fall out of the shopping cart 110 and end up on the shelf 130 or at a location corresponding to the location of the shelf 130, e.g., on the floor near the shelf 130. The sensor in the shopping cart 110 detects a loss in weight and reports this loss to the inventory tracker 150. If the bananas 122 are added to the shelf 130, a sensor on the shelf 130 detects the addition in weight and reports this information to the inventory tracker 150. The location of the shopping cart 110 and the location of the shelf 130 are also communicated to the inventory tracker 150. Alternatively, the location of the shelf 130 may be stored in the inventory tracker 150 and updated as needed. In addition, the time at which the reduction in weight is detected by the shopping cart 110 is reported to the inventory tracker 150.

If the shelf 130 detects an addition in weight, the time at which the addition in weight is detected is reported to the inventory tracker 150. If the weights, locations, and times match, the inventory tracker 150 determines that the bananas 122 have been removed from the shopping cart 110 and placed on the shelf 130. The inventory tracker 150 may send an alert to the store computer 170 to inform store personnel that the bananas 122 have been removed from the shopping cart 110 so that the store personnel can restock the bananas 122 in the bin 120.

If the weights do not match, e.g., because the bananas 122 are on the floor, and there is no addition in weight detected on the shelf 130, the inventory tracker 150 may alert the store computer 170. The alert may include the location of the shopping cart 110 at the time (or within a given time window from) when the loss in weight was detected by the shopping cart 110. This may provide an indication of the location of the bananas 122 as being, e.g., on the floor near the shelf 130.

Figure 1D:
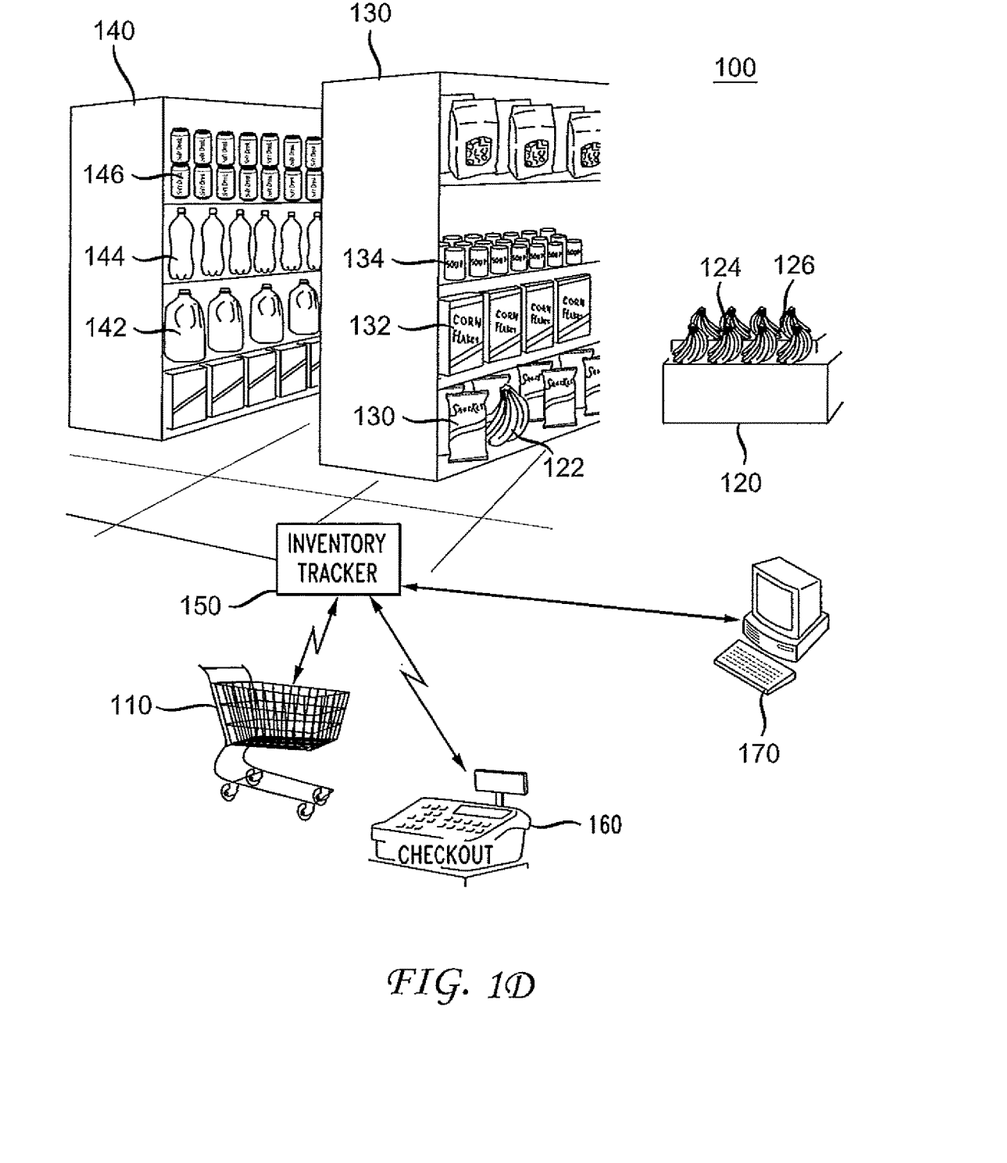

Referring now to FIG. 1D, the shopping cart 110 moves toward a checkout counter 160. At this point, the shopping cart 110 may contain a number of items. According to one embodiment, the inventory tracker 150 compares the weight of the items in the shopping cart 110 with the weight of the items on the shopping list. The inventory tracker 150 also determines whether the locations of the items in the shopping cart 110 match the location of the shopping cart 110. If there has been no detection of removal of an item from the shopping cart 110, then the locations of the items may be assumed to match the location of the shopping cart 110. If the weights match, the shopper may check out by simply swiping a credit card, debit card, or another form of payment at a checkout counter 160.

If the weight of the items in the shopping cart 110 does not match the weight of the items on the shopping list and/or the locations of the items do not match the location of the shopping cart 110, the inventory tracker 150 may take an appropriate action to reconcile what is in the cart 110 with what is on the shopping list.

For example, if the weight of the shopping cart 110 is less than the weight of the items on the shopping list, the inventory tracker 150 determines that an item has been removed from the shopping cart 110. The inventory tracker 150 may send an alert to the store computer 170 indicating that an item has been removed from the shopping cart 110. The inventory tracker 150 may determine, based on the total weight of the items and the individual weights of each item added to the shopping cart 110, which item may have been removed from the shopping cart 110. This determination may be verified with images from a camera in the shopping cart 110 and/or images from store cameras.

The location of the item removed from the shopping cart 110 may be accounted for, e.g., by the inventory tracker 150 and/or the store computer 170. For example, the historical locations of the shopping cart 110 may be checked by the inventory tracker 150 and/or the store computer 170 to determine what storage device was in the vicinity of the shopping cart 110, as the shopping cart 110 moved through the premises 100, and reported an addition in weight corresponding to the weight difference. For example, apples may have been removed from the shopping cart 110 and placed on the bin 120. The inventory tracker 150 may match the time at which the reduction in weight corresponding to the apples is reported by the shopping cart 110 with a time at which an addition in weight corresponding to the weight of the apples is reported by the bin 120. The inventory tracker 150 may then determine that the apples were removed from the shopping cart 110 and placed on the bin 120, thereby accounting for the location of the apples. This determination may be verified with images from a camera in the shopping cart 110 and/or images from store cameras.

If the weight of the shopping cart 110 is more than the weight of the items on the shopping list, the inventory tracker 150 determines that an item has been added to the shopping cart 110. In this case, the inventory tracker 150 may send an alert to the store computer 170 indicating that an item has been added to the shopping cart 110. The historical locations of the shopping cart 110 may be checked by the inventory tracker 150 and/or the store computer 170 to determine what storage devices that held items having the same weight as the weight difference were in the vicinity of the shopping cart 110 as the shopping cart 110 moved through the premises 100. For example, apples may have fallen out of a bin and onto the floor, and the apples may have then been picked up and added to the shopping cart 110. The inventory tracker 150 may match the time at which the reduction in weight corresponding to the apples is reported by a bin on which the apples were stored with a time at which an item having a weight corresponding to the weight of the apples was added to the shopping cart 110. The inventory tracker 150 may then determine that the apples were added to the shopping cart 110. This determination may be verified with images from a camera in the shopping cart 110 and/or images from store cameras.

Although not shown, it should be appreciated that the shopping cart 110 may include a payment mechanism which the shopper may use to pay for the items in the shopping cart 110. The shopper may pay for items as they are placed in the shopping cart 110 or pay for all the items in the shopping cart 110 before leaving the premises 100. The shopper may indicate a selection for payment using a keypad on a communication device attached to the shopping cart, described in more detail below. If the shopper decides to pay for items as they are placed in the shopping cart 110, the inventory tracker 150 first performs the weight, location, and time matching described above to verify that an item that is detected as being placed in the shopping cart 110 is the item that is detected as being removed from a storage container. Once the shopper swipes a card or authorizes another form of payment, each item may automatically be paid for as it is placed in the shopping cart 110 and verified by the inventory tracker 150. Alternatively, the shopper may manually indicate that an item is to be paid for as it is placed in the shopping cart 110 and verified by the inventory tracker 150, e.g., by pressing "Pay" on a communication device connected to the shopping cart 110.

If an item that has already been paid for is removed from the shopping cart 110, this information may be reported to the inventory tracker 150. The inventory tracker 150 may, in turn, credit the shopper's form of payment for the item and also report removal of the item to the store computer 170.

Also, if the shopper does not pay for all the items in the shopping cart 110 before leaving the premises 100, this information may be reported to the inventory tracker 150, and the inventory tracker 150 may charge the shopper's form of payment for the items not paid for, send an alert to the shopping cart 110 indicating that there is an item that needs to be paid for and/or send an alert to the store computer 170 indicating that there is an item that needs to be paid for.

Although the inventory tracker 150 and the store computer 170 are shown as distinct devices in FIGS. 1A-1D, it should be appreciated that they may be incorporated into a single device.

Figure 2:
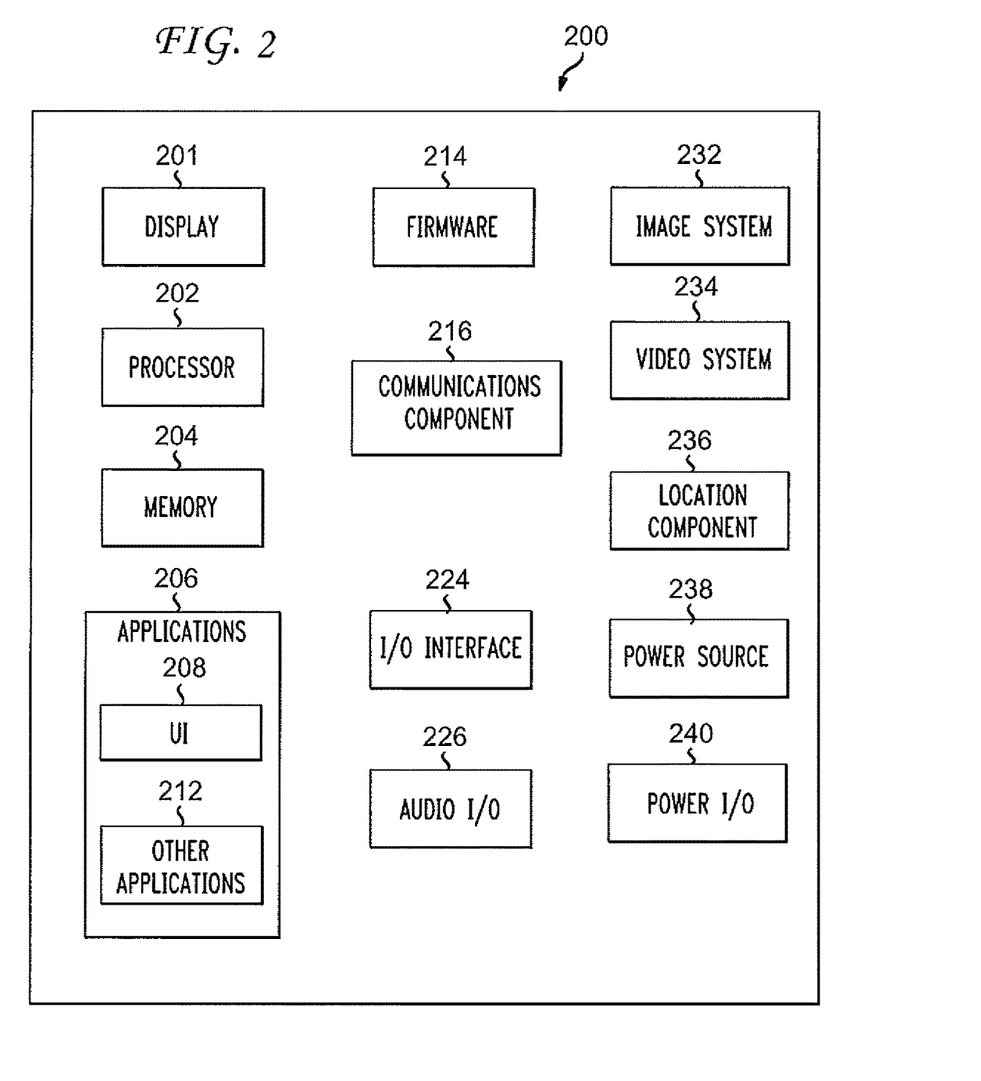
FIG. 2 illustrates a block diagram of a device with which a shopping cart may be implemented, according to an illustrative embodiment.

FIG. 2 illustrates a schematic block diagram of a communication device which may be attached to a container, such as a shopping cart 110, as described above, and FIG. 3 illustrates a block diagram of a computing system with which the inventory tracker 150 may be implemented, according to illustrative embodiments. Although no connections are shown between the components illustrated in FIGS. 2 and 3, those skilled in the art will appreciate that the components can interact with each other via any suitable connections to carry out device functions.

Figure 3:
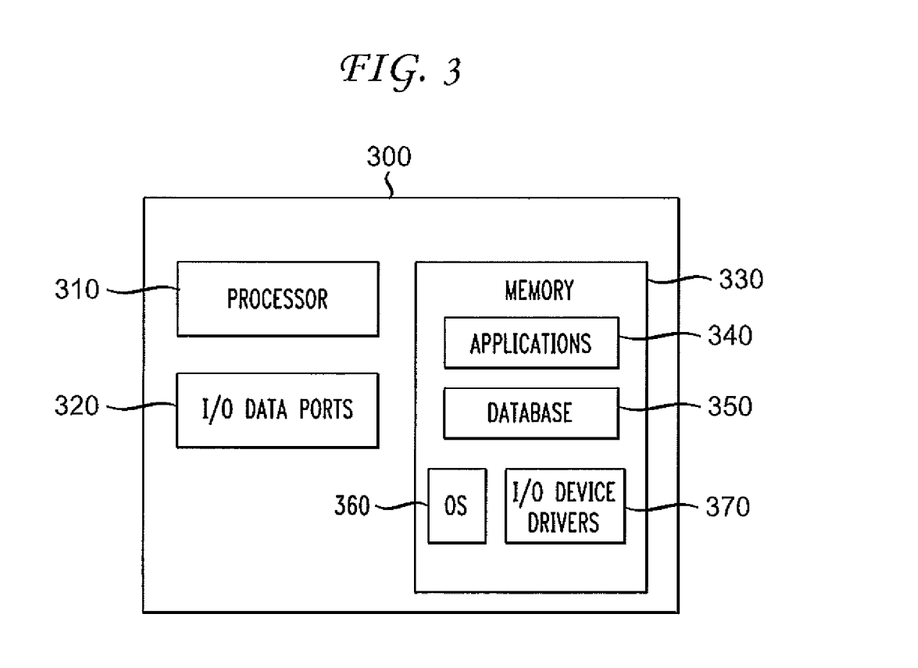
FIG. 3 illustrates a block diagram of a computing device with which an inventory tracking device may be implemented, according to an illustrative embodiment.

It should be understood that FIGS. 2 and 3 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the devices shown in FIGS. 2 and 3.

Referring to FIG. 2, a communication device 200 may be a multimode communication device and can include a variety of computer-readable media. The device 200 may include a display 201 for displaying, e.g., a shopping list of items and prices as items are added to the container.

The device 200 may include a processor 202 for controlling and/or processing data. A memory 204 can interface with the processor 202 for the storage of data and/or applications 206. Data stored in the memory 204 may include data that identifies a shopping cart 110 to which the communication device 200 is attached. Such data may be populated when the communication device 200 is attached to the shopping cart 110. The data stored in the memory 204 may also include data indicative of items placed in the shopping cart 110, respective prices of items, size and shape of items, etc. This data may be populated responsive to sending information indicative of an addition/reduction of weight in the shopping cart 110 to the inventory tracker 150 and receiving item/price information from the inventory tracker 150, as described above.

The applications 206 may include, for example, a user interface (UI) application 208. The UI application 208 may be used for entering data into the memory 204 indicative of addition of items to and removal of items from the shopping cart 110 responsive to a shopper scanning a barcode on the item. Such user interaction may be facilitated via, e.g., a scanner, touchscreen, or Q-code sensor included in the device 200 or communicating with the device via the I/O interface 224.

The applications 206 may include other applications 212, such as, for example, add-ons, plug-ins, email applications, music applications, video applications, camera applications, location-based service (LBS) applications, power conservation applications, game applications, productivity applications, entertainment applications, combinations thereof, and the like, as well as subsystem and/or components. According to one embodiment, the camera application may be used in conjunction with an image system 232 and/or a video system 234 to detect addition/removal of an item to the shopping cart 110. Also, the LBS application may be used in conjunction with a location component 236 to determine a location of the shopping cart 110 with respect to the premises 100.

According to illustrative embodiments, the applications 206 may also include an application for sending an indication that an item is added to and/or removed from the shopping cart 110 to the inventory tracker 150. The applications 206 may also include an application for sending an indication of a time at which the item is added to and/or removed from the shopping cart 110. The time indication may be in the form of a timestamp which may be produced by a timer included in the communication device (not shown). The applications 206 may also include an application for sending information to the inventory tracker 150 that indicates the location of the shopping cart 110 with respect to the premises 100.

The applications 206 can be stored in the memory 204 and/or in firmware components 214 and can be executed by the processor 202. The firmware 214 can also store code for execution during initialization of the device 200.

A communications component 216 may interface with the processor 202 to facilitate wired/wireless communication with devices, such as the inventory tracker 150. Such communication may occur over, e.g., a local area network (LAN), personal area network (PAN), and other networks, which may be implemented using, e.g., WIFI, cellular signals, WiMax, LTE, satellite signals, and other current and future wireless signals and protocols. The communications component 216 may also include a transceiver for other communication technologies, such as, for example, BLUETOOTH, infrared, IRDA, NFC, RF, and the like. It should be appreciated that multiple transceivers, dedicated to different communication technologies, may be used. The communications components 216 may also facilitate reception from terrestrial radio networks, digital satellite radio networks, Internet based radio service networks, combinations thereof, and the like.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like. The I/O interface 224 can accept other I/O devices such as, for example, scanners (e.g., RFID, UPC, or Q-code scanners), such as those described above, for detecting addition of items to and removal of items from the shopping cart 110. In addition, the I/O interface 224 may accept other I/O devices, e.g., keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

The photos/videos may be used to identify items added to/removed from the shopping cart 110 in addition to or instead of the weight sensor or scanner. For example, the image system 232 and/or video system 234 may capture a photo/video of an item added to or removed from the shopping cart 110 and may transmit this information to the inventory tracker 150. The inventory tracker 150 may, in turn, use image recognition to identify the item based, e.g., on images stored in a memory of the inventory tracker 150. The image recognition may be as simple as size recognition. For example, if a weight sensor in the shopping cart 110 detects that an item that is the same weight as a particular box of cereal that is added to the shopping cart 110, the inventory tracker 150 may use image recognition to verify that the item added to the shopping cart 110 is the same size as the particular box of cereal. If the inventory tracker 150 verifies that the sizes match, the inventory tracker 150 may send information to the communication device 200 that identifies the item, and the item may be added to the shopping list.

As another example, the image system 232 and/or video system 234 may be useful in identifying items added to the shopping cart 110 that do not correspond to items in the inventory tracker database 150. For example, the image system 232 and/or video system 234 may capture an image/video of a child crawling into the shopping cart 110 and transmit this image/video to the inventory tracker 150. Though the weight sensor in the shopping cart 110 detects and reports an addition in weight, the inventory tracker 150 can use image recognition to determine that the addition in weight does not correspond to an addition of an item of inventory to the shopping cart 110.

Similarly, if an item is removed from the shopping cart 110 and substituted with another item of the same approximate weight, e.g., a shopper's purse, that is not part of the store inventory, an image/video may be transmitted to the inventory tracker 150, and the inventory tracker 150 may use image recognition to identify that there is an item in the shopping cart 110 that is not part of the store inventory. The inventory tracker 150 may then transmit information to the communication device 200 to update the shopping list to take the removed item off the shopping list. The inventory tracker 150 may also send an alert to the store computer 170 with a copy of the image/video. Store personnel may review the image/video and take appropriate action, e.g., intervene to prevent shoplifting.

In addition to the image system 232 and video system 234 in the communication device, cameras within the premises 100 may be used, in conjunction with the inventory tracker 150, to verify the identity of items added to/removed from the shopping cart 110. The cameras within the premises 100 may also be used to associate a shopper with a particular item. For example, an image of a shopper may be taken as the shopper enters the premises 100, and this image may be transmitted to the store computer 170 and/or the inventory tracker 150. Then, as the shopper moves through the store, the store computer 170 and/or the inventory tracker 150 may track the shopper using, e.g., facial recognition. Thus, if the shopper picks up an item in the store but does not add it to a shopping cart, the image/video captured by the store camera may be used to associate the item with the shopper. Images and video from such cameras may also be communicated to the store computer 170 to prevent shoplifting, to alert the store personnel of items removed from the shopping cart 110 and placed in a place other than the storage device from which they were picked up, etc.

Referring again to FIG. 2, a location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, and satellites, location transmitters and/or beacons, wireless network transmitters and receivers, for example, WiFi hotspots, radio transmitters, combinations thereof and the like. The location component 236 may also be implemented with a proximity sensor fitted on the shopping cart 110 that senses the proximity of the shopping cart 110 to a container and/or other location within the store equipped with a transceiver for close field communication. The device 200 may obtain, generate, and/or receive data to identify its location or can transmit data used by other devices to determine the device location.

The device 200 may also include a power source 238, such as batteries and/or other power subsystems (AC or DC). The power source 238 can interface with an exemplary power system or charging equipment via a power I/O component 240.

Although not shown, it should be appreciated that the communication device 200 may be included in or be attached to a payment mechanism with which a shopper may pay for items as described above, rather than checking out at the checkout counter 160.

Although not illustrated, it should be appreciated that the storage devices for storing items, such as the bin 120 and the shelves 130 and 140 may contain components similar to those illustrated and described above with regard to FIG. 2, such as, but not limited to, a location component, a communication component, and a timer.

FIG. 3 is a block diagram of a computing device 300 with which the inventory tracker 150 may be implemented. According to an illustrative embodiment, the computing device 300 may be implemented in any suitable computing device and on any suitable network.

Referring to FIG. 3, the computing device 300 includes a processor 310 that receives and transmits information from communication devices attached to the shopping cart 110, the bin 120, and the shelves 130 and 140 via I/O data ports 320. As described above, the inventory tracker 150 may also receive images captured by store cameras. As noted above, the information received by the processor 310 includes detected additions/removal of items (e.g., additions/reductions in weight, images of items, etc.), time information, and location information. The processor 310 executes applications 340 stored in the memory 330 to process this information as described in more detail below. The processor 310 also transmits information to the store computer 170 and the checkout counter 160 via I/O data ports 320. As described above, such information may include updated shopping lists, alerts, etc. The I/O data ports 320 can be implemented with, e.g., an interface including an antenna or other suitable type of transceiver through which data and signals may be transmitted and received wired and/or wirelessly.

The computing device 300 also includes a physical hard drive. The processor 310 communicates with the memory 330 and the hard drive via, e.g., an address/data bus (not shown). The processor 310 can be any commercially available or custom microprocessor. The memory is 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, and input/output (110) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310. The applications 340 include various programs that implement the various features of the device 300. The applications 340 may include an application for recognizing an item indicated as being added to or removed from a container or a storage device based on a reported addition/reduction in weight, a captured image, etc. The applications 340 may also include an application for updating a shopper's shopping list based on the item recognition. The applications 340 may also include an application for determining a location of a container and a location of an item. The location of an item may be determined based, e.g., on association of a time at which an item was added to/removed from a storage device or a container with a location of a container at the same time as described above.

The database 350 represents the static and dynamic data used by the applications 340, the OS 360, the I/O device drivers 370 and other software programs that may reside in the memory 330. The database 350 may store inventory information, e.g., weights of items and images of items, that may be used to identify items added to/removed from containers and storage devices. The database 350 may also store information identifying shopping carts 110 and shelves 130, 140, images of shoppers, reported timestamps, etc.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), a wide area network (WAN), personal area network (PAN), and other networks, which may be implemented using, e.g., WIN, cellular signals, WiMax, LTE, satellite signals, the Internet, BLUETOOTH, infrared, IRDA, NFC, RF, combinations thereof; and the like and other current and future wireless signals and protocols.

Figure 4:
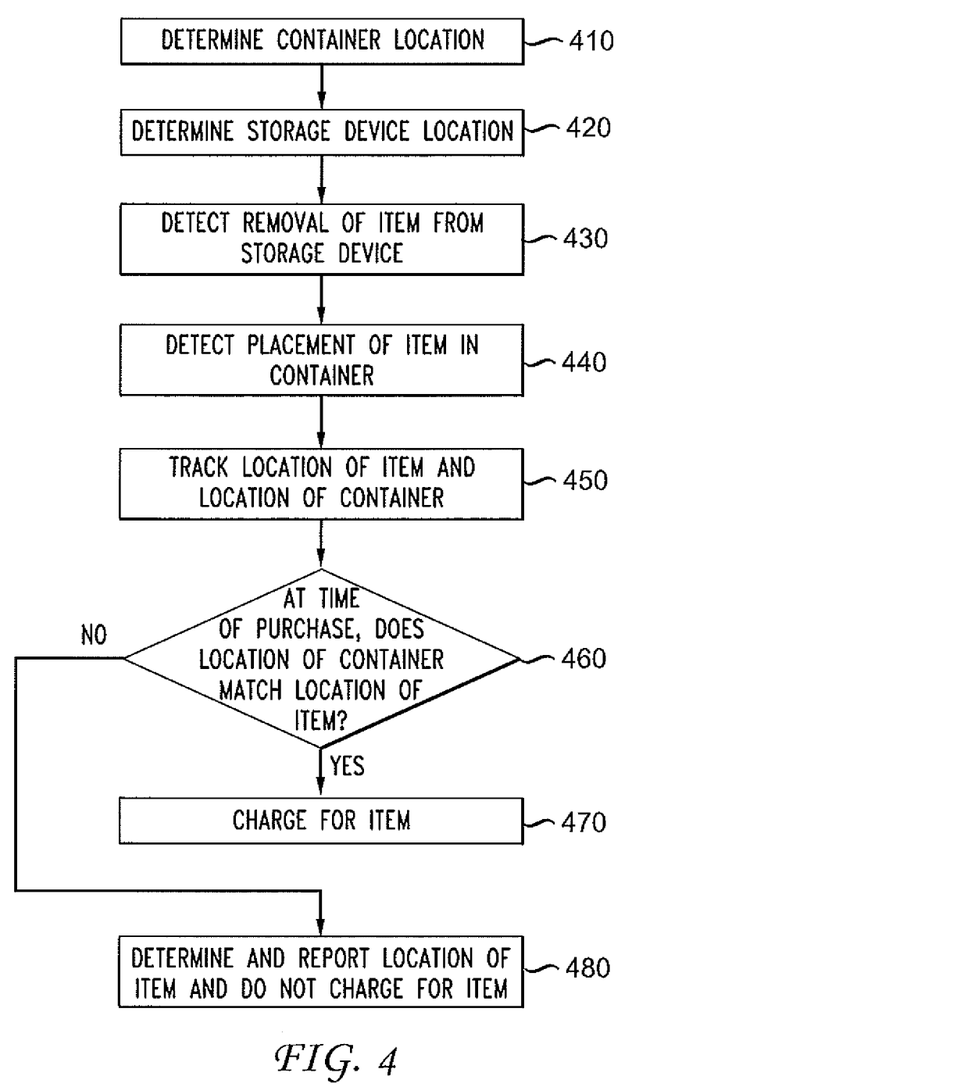
FIG. 4 illustrates a method for tracking inventory according to an illustrative embodiment.

FIG. 4 illustrates a method for tracking inventory during a shopping experience according to an illustrative embodiment. The method begins at step 410 at which a container location is determined, e.g., by the communication device attached to shopping cart 110 reporting its location to the inventory tracker 150. At step 420, a location of a storage device, e.g., the bin 120, is determined, e.g., by the bin 120 reporting its location to the inventory tracker 150. At step 430, removal of an item from the storage device is detected, e.g., by a sensor detecting a loss of weight on the storage device. At step 440, placement of the item in the container, e.g., the shopping cart 110, is detected. At step 450, the location of the item and the location of the container are tracked by the inventory tracker 150 as the shopping cart 110 moves through the store premises. For a purchase-related transaction, e.g., at a time of purchase, the inventory tracker 150 determines whether the location of the container matches (or corresponds to) the location of the item at step 460. If the location of the container matches the location of the item, at step 470 the inventory tracker 150 includes the cost for the item in the purchase-related transaction, such that the item is charged for. If the location of the container does not match the location of the item, at step 480 the location of the item is accounted for, e.g., determined by the inventory tracker 150, and reported to the store computer 170, and the inventory tracker 150 does not include the cost for the particular item in the purchase-related transaction, such that the item is not charged for.

According to illustrative embodiments, inventory is tracked in an environment, such as a retail store. It should be appreciated that the concepts described herein may be applicable to any environment that would benefit from inventory tracking. For example, the concepts described herein may be used in automated warehouses, e.g., to account items that may fall off a robotic cart by mistake but can be tracked based on weight.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. An inventory security system comprising:
    a first communication device associated with a mobile container, the first communication device configured to electrically couple to a first sensor, wherein the first sensor detects weight changes associated with the mobile container, and wherein the first communication device comprises a positioning device configured to determine a position of the mobile container;
    a second communication device associated with an item bin, the second communication device configured to electrically couple to a second sensor, wherein the second sensor detects weight changes associated with the item bin; and
    a tracking system comprising
        a processor, and
        a memory that stores instructions that, when executed by the processor, cause the tracking system to perform operations comprising
            receiving, from the first communication device associated with the mobile container when the first sensor associated with the first communication device detects a weight change associated with the mobile container, location information indicating the position of the mobile container, weight information indicating the weight change associated with the mobile container, and time information indicating a time at which the weight change associated with the mobile container is detected,
            receiving, from the second communication device associated with the item bin when the second sensor associated with the second communication device detects a weight change associated with the item bin, weight information indicating the weight change associated with the item bin and time information indicating a time at which the weight change associated with the item bin is detected,
            determining the position of the item bin,
            determining whether the position of the mobile container correlates with the position of the item bin,
            determining whether the weight change associated with the mobile container correlates with the weight change associated with the item bin,
            determining whether the time at which the weight change associated with the mobile container is detected correlates with the time at which the weight change associated with the item bin is detected, and
            based, at least in part, on determining that the position of the mobile container correlates with the position of the item bin, that the weight change associated with the mobile container correlates with the weight change associated with the item bin, and that the time at which the weight change associated with the mobile container is detected correlates with the time at which the weight change associated with the item bin is detected, determining that an item from the item bin has been removed from the item bin and placed into the mobile container, wherein the time at which the weight change associated with the mobile container is detected is determined to correlate with the time at which the weight change associated with the item bin is detected when the time at which the weight change associated with the mobile container is detected is within a time window from the time at which the weight change associated with the item bin is detected, and wherein the time window varies based on whether the position of the mobile container correlates with the position of the item bin and whether the weight change associated with the mobile container correlates with the weight change associated with the item bin such that the time window is extended when the position of the mobile container correlates with the position of the item bin and when the weight change associated with the mobile container correlates with the weight change associated with the item bin.

2. The inventory security system of claim 1, wherein:
    determining whether the position of the mobile container correlates with the position of the item bin comprises determining whether the position of the mobile container matches the position of the item bin within a position tolerance of difference; and
    determining whether the weight change associated with the mobile container correlates with the weight change associated with the item bin comprises determining whether the weight change associated with the mobile container matches the weight change associated with the item bin within a weight tolerance of difference.

3. The inventory security system of claim 1, wherein the operations further comprise adding the item to a list of items in response to determining that the item from the item bin has been removed from the item bin and placed into the mobile container.

4. The inventory security system of claim 3, wherein the operations further comprise determining that an additional item not on the list of the items has been added to the mobile container by comparing a total weight of the items on the list of the items with a weight of the mobile container to determine that the total weight of the items on the list of the items is less than the weight of the mobile container by a weight difference.

5. The inventory security system of claim 4, wherein the operations further comprise determining an identity of the additional item not on the list of the items by checking historical positions of the mobile container to determine any item bin, within a vicinity of one of the historical positions of the mobile container, that store at least one item having a weight associated with the weight difference.

6. The inventory security system of claim 3, wherein the operations further comprise:
   determining that an additional item on the list of the items has been removed from the mobile container by comparing a total weight of the items on the list of the items with a weight of the mobile container to determine that the total weight of the items on the list of the items is more than the weight of the mobile container by a weight difference; and
   determining an identity of the additional item on the list of the items that has been removed from the mobile container by checking historical positions of the mobile container to determine any item bin, within a vicinity of one of the historical positions of the mobile container, that reported an addition in weight corresponding to the weight difference.

7. A method comprising:
   detecting, by a first sensor of a first communication device associated with a mobile container, a weight change associated with the mobile container;
   determining, by a positioning device of the first communication device, a position of the mobile container;
   detecting, by a second sensor of a second communication device associated with an item bin, a weight change associated with the item bin;
   receiving, by a tracking system, from the first communication device associated with the mobile container when the first sensor associated with the first communication device detects the weight change associated with the mobile container, location information indicating the position of the mobile container, weight information indicating the weight change associated with the mobile container, and time information indicating a time at which the weight change associated with the mobile container is detected;
   receiving, by the tracking system, from the second communication device associated with the item bin when the second sensor associated with the second communication device detects the weight change associated with the item bin, weight information indicating the weight change associated with the item bin and time information indicating a time at which the weight change associated with the item bin is detected;
   determining, by the tracking system, the position of the item bin;
   determining, by the tracking system, whether the position of the mobile container correlates with the position of the item bin;
   determining, by the tracking system, whether the weight change associated with the mobile container correlates with the weight change associated with the item bin;
   determining, by the tracking system, whether the time at which the weight change associated with the mobile container is detected correlates with the time at which the weight change associated with the item bin is detected; and
   based, at least in part, on determining that the position of the mobile container correlates with the position of the item bin, that the weight change associated with the mobile container correlates with the weight change associated with the item bin, and that the time at which the weight change associated with the mobile container is detected correlates with the time at which the weight change associated with the item bin is detected, determining, by the tracking system, that an item from the item bin has been removed from the item bin and placed into the mobile container, wherein the time at which the weight change associated with the mobile container is detected is determined to correlate with the time at which the weight change associated with the item bin is detected when the time at which the weight change associated with the mobile container is detected is within a time window from the time at which the weight change associated with the item bin is detected, and wherein the time window varies based on whether the position of the mobile container correlates with the position of the item bin and whether the weight change associated with the mobile container correlates with the weight change associated with the item bin such that the time window is extended when the position of the mobile container correlates with the position of the item bin and when the weight change associated with the mobile container correlates with the weight change associated with the item bin.

8. The method of claim 7, wherein:
   determining whether the position of the mobile container correlates with the position of the item bin comprises determining whether the position of the mobile container matches the position of the item bin within a position tolerance of difference; and
   determining whether the weight change associated with the mobile container correlates with the weight change associated with the item bin comprises determining whether the weight change associated with the mobile container matches the weight change associated with the item bin within a weight tolerance of difference.

9. The method of claim 7, further comprising adding, by the tracking system, the item to a list of items in response to determining that the item from the item bin has been removed from the item bin and placed into the mobile container.

10. The method of claim 9, further comprising determining, by the tracking system, that an additional item not on the list of the items has been added to the mobile container by comparing a total weight of the items on the list of the items with a weight of the mobile container to determine that the total weight of the items on the list of the items is less than the weight of the mobile container by a weight difference.

11. The method of claim 10, further comprising determining an identity of the additional item not on the list of the items by checking historical positions of the mobile container to determine any item bin, within a vicinity of one of the historical positions of the mobile container, that stores at least one item having a weight associated with the weight difference.

12. The method of claim 9, further comprising:
   determining, by the tracking system, that an additional item on the list of the items has been removed from the mobile container by comparing a total weight of the items on the list of the items with a weight of the mobile container to determine that the total weight of the items on the list of the items is more than the weight of the mobile container by a weight difference; and determining an identity of the additional item on the list of the items that has been removed from the mobile container by checking historical positions of the mobile container to determine any item bin, within a vicinity of one of the historical positions of the mobile container, that reported an addition in weight corresponding to the weight difference.

13. The inventory security system of claim 5, wherein the operations further comprise verifying the identity of the additional item not on the list of the items based on size recognition of the additional item determined using an image captured by an image system of the first communication device.

14. The method of claim 11, further comprising verifying the identity of the additional item not on the list of the items based on size recognition of the additional item determined using an image captured by an image system of the first communication device.

* * * * *